A. FURNISS.
Moustache-Guard.
No. 197,028.            Patented Nov. 13, 1877.
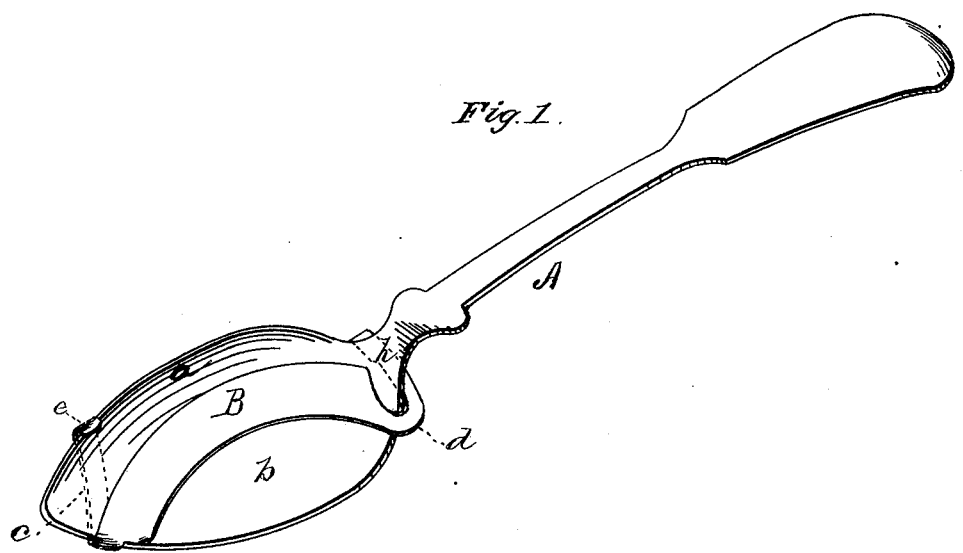
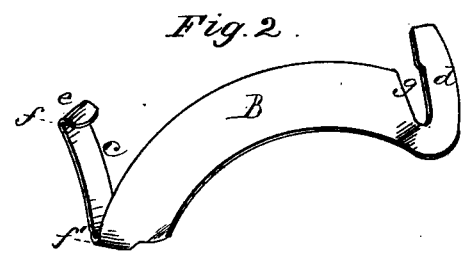
Witnesses
F. J. Masi
M. P. Utley
Inventor,
Albert Furniss,
by E. W. Anderson,
Attorney.

UNITED STATES PATENT OFFICE.

ALBERT FURNISS, OF MERIDEN, CONNECTICUT.

IMPROVEMENT IN MUSTACHE-GUARDS.

Specification forming part of Letters Patent No. 197,028, dated November 13, 1877; application filed April 10, 1877.

*To all whom it may concern:*

Be it known that I, ALBERT FURNISS, of Meriden, in the county of New Haven and State of Connecticut, have invented a new and valuable Improvement in Detachable Mustache-Guards for Cups and similar vessels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a spoon with my detachable mustache-guard applied, and Figs. 2 and 3 are detail perspective views of the guards detached.

This invention has relation to improvements in means for protecting the mustache from dipping into and becoming covered with liquid food in eating; and it consists in a detachable metallic plate that is secured over the bowl of a spoon, cup, or other like device, and prevents the ends of the mustache from dipping into the contents of the said vessel, and yet allows the same to flow freely into the mouth in supping or drinking, as will be hereinafter fully shown and described.

In the accompanying drawings, the letter A designates an ordinary spoon, in connection with which I propose to illustrate my invention. B represents my improved mustache guard or protector, that extends from end to end of the bowl $a$ in a curve, and forms, with an edge of the spoon, an aperture, $b$, through which a liquid or semi-liquid food—as soup or mush—will have free passage. This plate is longitudinally curved as to that part spanning the bowl of the spoon, and may be slightly convex with reference to the concavity of said bowl. This plate has, at its front and rear ends, catches, lettered, respectively, $c$ and $d$, parallel, or nearly so, to each other, and slightly oblique to its plane. Catch $c$ is formed of a narrow tongue, that is bent downward and across the length of the plate, and upward and inward at its free end, so as to form a hook, $e$, that will engage over the opposite edge of the spoon. The opposite interior curves $f\,f'$ are inclined relative to each other, so as to correspond to the bevel of the spoon-point. This catch, when the point of the spoon is passed into it, as shown in Fig. 1, will sustain the front end of the guard.

The rear catch $d$ is a single strip of metal, separated from the rear end of the guard by a deep slot, $g$, into which the shank $h$ of the spoon is received when the said catch is sprung under the shank behind the bowl, as shown in Fig. 1. The catch $d$ is sufficiently springy and rigid to bind upon the shank and hold the rear end of the guard to its adjustment thereon.

This guard may be made of silver or any of the usual materials, and of various sizes to suit the different varieties of spoons.

This device is especially useful to mustachioed travelers, as they may be carried in a pocket and applied to a spoon whenever needed.

I am aware that detached mustache-guards for drinking-vessels are not new, and I therefore make no broad claim to such a device; but

What I claim as new, and desire to secure by Letters Patent, is—

The mustache-guard B, having end catches $c\ d$, the former provided with the hook $e$, and the whole adapted to be applied to and bind upon the edges of a spoon or similar vessel, substantially as specified.

In testimony that I claim the above I have hereunto subscribed my name in the presence of two witnesses.

ALBERT FURNISS.

Witnesses:
E. A. MERRIMAN,
JOHN THOMPSON.